US005745199A

United States Patent [19]

Suzuki et al.

[11] Patent Number: 5,745,199

[45] Date of Patent: Apr. 28, 1998

[54] LIQUID CRYSTAL DISPLAY DEVICE

[75] Inventors: Motoyuki Suzuki, Kyoto; Tetsuo Uchida, Otsu; Yuko Mikami, Kusatsu, all of Japan

[73] Assignee: Toray Industries, Inc., Japan

[21] Appl. No.: 700,409

[22] PCT Filed: Jan. 25, 1996

[86] PCT No.: PCT/JP96/00130

§ 371 Date: Sep. 25, 1996

§ 102(e) Date: Sep. 25, 1996

[87] PCT Pub. No.: WO96/23245

PCT Pub. Date: Aug. 1, 1996

[30] Foreign Application Priority Data

| | | | |
|---|---|---|---|
| Jan. 26, 1995 | [JP] | Japan | 7-031625 |
| Jul. 14, 1995 | [JP] | Japan | 7-178867 |
| Jul. 17, 1995 | [JP] | Japan | 7-179920 |

[51] Int. Cl.$^6$ .......... G02F 1/1335

[52] U.S. Cl. .......... 349/95; 349/57

[58] Field of Search .......... 349/95, 57, 179, 349/200

[56] References Cited

U.S. PATENT DOCUMENTS

| | | | |
|---|---|---|---|
| 5,384,882 | 1/1995 | Shimamune et al. | 385/116 |
| 5,555,476 | 9/1996 | Suzuki et al. | 349/95 |

*Primary Examiner*—William L. Sikes

*Assistant Examiner*—Tiep H. Nguyen

*Attorney, Agent, or Firm*—Austin R. Miller

[57] ABSTRACT

A transmission type liquid crystal display device having a liquid crystal cell and a microlens array sheet attached to the observation surface of the liquid crystal cell, wherein the microlens array sheet has at least one diffusion axis in the plane and the direction of the diffusion axis is conformed to a direction of the liquid crystal orientation of the liquid crystal cell, and a transmission type liquid crystal display device including a liquid crystal cell, a microlens array sheet attached to the observation surface of the liquid crystal cell and a backlight source, wherein a specified relationship is provided between the directivity of light emission of the backlight source and the pitch of arrangement of display elements of the liquid crystal cell in a minute unit lens arrangement direction. This liquid crystal display device is substantially independent of view angle and has a wide visible angle and high image quality.

14 Claims, 13 Drawing Sheets

F I G. 17
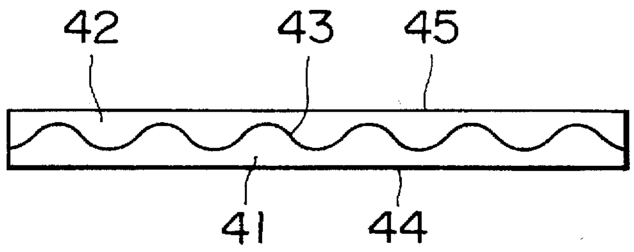
F I G. 18
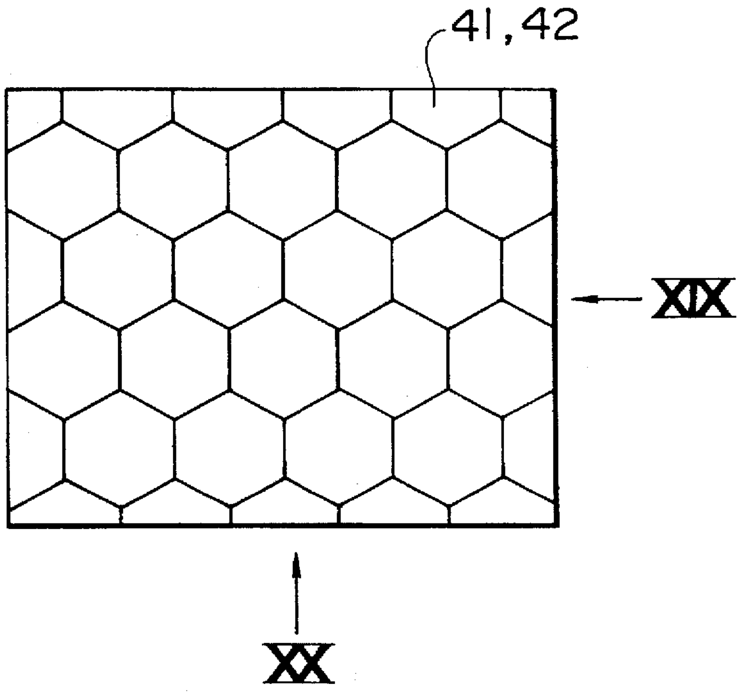

LIQUID CRYSTAL DISPLAY DEVICE

TECHNICAL FIELD OF THE INVENTION

The present invention relates to a liquid crystal display device, and specifically to a transmission type liquid crystal display device substantially independent of view angle and having a wide visiblity angle and high image quality.

BACKGROUND ART OF THE INVENTION

In liquid crystal display devices, a displayed image is observed by utilizing an electro-optical effect of liquid crystal molecules, that is, by using a body arranged with liquid crystal optical shutters which change ray transmittance or reflectance by utilizing optical anisotropy (anisotropy in refractive index), orientation, flowability and dielectric anisotropy of liquid crystal molecules, and changing the orientation condition of the liquid crystals by applying an electric field or sending an electric current to appropriate display elements. Such liquid crystal display devices are broadly used for personal computers, word processors, television receivers, portable electronic instruments, game machines, information display devices mounted on cars, and other information display devices.

As a display principle in liquid crystal display devices, a twisted nematic liquid crystal, in which a voltage applied to a nematic liquid crystal layer twisted at an angle of about 90 degrees is controlled and the change of polarization of the resulting liquid crystal layer is displayed combining with a polarizer, is broadly used because of its high display performance.

However, in liquid crystal display devices, there is a property dependent on view angle that the image quality varies depending upon the observation direction (a property wherein a display quality or a displayed image varies depending on the direction of an observer relative to the display scope. When the view angle is beyond a certain range, the displayed image cannot be recognized. Hereinafter, the range of angle acceptable to an observer is also referred to merely as "visible angle".). Particularly, in case of a twisted nematic liquid crystal, there is a problem that color tone varies, and that the visible angle is narrow.

With this problem, technology for forming one pixel with a plurality of liquid crystal orientation regions such as orientation dividing method is proposed.

Further, proposed is a technology for disposing an optical compensator having an anisotropy in birefringence at a position between a polarizer and a liquid crystal cell.

Furthermore, it is described in JP-A-HEI-5-249459 that the dependency of display quality on observation direction can be decreased and a liquid crystal display device having a wider visible angle can be obtained as compared with a broadly used conventional liquid crystal display device, i.e., a usual liquid crystal display device which does not use a microlens array sheet, by a transmission type liquid crystal display device which has a liquid crystal cell including display elements arranged lengthwise and crosswise, a microlens array sheet attached to the observation surface of the liquid crystal cell and including minute unit lenses arranged in plane and a backlight source.

Still further, it is described in JP-A-HEI-6-27454 that a liquid crystal display device capable of enlarging the visible angle while preventing deterioration of the image quality can be obtained by forming a microlens array sheet by providing a first substance layer and a second substance layer having a refractive index less than the refractive index of the first substance layer between two planes extending parallel to each other and arranging minute unit lenses in plane which function as lenses by providing concavities and/or convexities to an interface defined between the first and second substance layers, and by attaching the microlens array sheet such that the second substance layer side of the microlens array sheet is directed to the liquid crystal cell side and the first substance layer side thereof is directed to the observation side.

Furthermore, a technology is known as disclosed in JP-A-HEI-6-95099 that a liquid crystal display device having a wide visible angle can be obtained by using a backlight source having a high directivity and a light diffusion plate disposed on an observation side.

However, the above-described conventional methods have the following problems.

In the above-described method for disposing an optical compensator, there is a problem that, even if dependency on view angle in a specified direction can be reduced, dependency on view angle in all directions cannot be improved.

Even in the above-described orientation dividing method, an advantage for improving the dependency on view angle is little, and there is a problem in productivity because the burden loaded on the process for manufacturing liquid crystal display devices is great.

In any conventional technology, it cannot be achieved to improve dependency on view angle in all directions, namely, dependency on view angle not only in the vertical and lateral directions but also obliquely in upper and lower directions.

Further, recently, in addition to improvement of image quality of a liquid crystal display device, a high definition display device such as one having a pitch of display elements of not more than 0.4 mm has been developed. However, the problem of dependency on view angle of display quality, which is one of the defects of a liquid crystal display device, has not yet been solved sufficiently. According to investigation by the inventors of the present invention, it is considered that this is because any of the several proposed technologies for enlarging view angle have defects deteriorating image quality, or making the manufacturing process of the devices complicated.

According to the method for providing a microlens array sheet on the observation surface of a liquid crystal cell as described in the above-described JP-A-HEI-5-249553, although the visible angle can be enlarged, there is a defect that particularly an image observed from the front side is observed to be fuzzy. This defect is remarkable in a high definition display device such as one having a pitch of display elements of not more than 0.4 mm, and there is an extreme case where the letters displayed on the liquid crystal display device cannot be recognized for reading.

Further, in the method for providing not a microlens array sheet but a light diffusion plate or a light scattering plate for diffusing and transmitting an incident light randomly on an observation surface of a liquid crystal display device, the "fuzziness" becomes further intense as compared with that in the method for providing a microlens array sheet.

DISCLOSURE OF THE INVENTION

Accordingly, an object of the present invention is to solve the above-described defects and to provide a liquid crystal display device that is substantially independent of view angle even if observed from any direction and having an extremely wide visible angle.

Another object of the present invention is to realize a liquid crystal display device having a wide visible angle and high image quality even in a case of a high definition display device having a small pitch of arrangement of pixels of a liquid crystal cell.

To accomplish the above objects, a liquid crystal display device according to the present invention is constructed as a transmission type liquid crystal display device having at least a liquid crystal cell including display elements arranged lengthwise and crosswise and a microlens array sheet attached to an observation surface of the liquid crystal cell and including minute unit lenses arranged in plane, and characterized in that the microlens array sheet has at least one diffusion axis in the plane, and wherein the direction of the diffusion axis of the microlens array sheet is within about 15 degree to the direction of the liquid crystal orientation of the liquid crystal cell (liquid crystal display device I).

Further, a liquid crystal display device according to the present invention is constructed as a transmission type liquid crystal display device having a liquid crystal cell including display elements arranged lengthwise and crosswise, a microlens array sheet attached to an observation surface of the liquid crystal cell and including minute unit lenses arranged in plane and a backlight source, and characterized in that the relationship between the directivity of light emission of the backlight source and the pitch of arrangement of the display elements of the liquid crystal cell in a minute unit lens arrangement direction satisfies the following equation (1) (liquid crystal display device II).

$$p \geqq d \tan \chi \qquad (1)$$

Where, "p" (mm) indicates a length of a display element of the liquid crystal cell in the minute unit lens arrangement direction, that is, the pitch of arrangement of the display elements. Here, when the liquid crystal cell forms one dot with a plurality of pixels for a purpose such as color display, the one dot is defined as the display element. "d" (mm) indicates the distance from a liquid crystal layer to the minute unit lenses. "χ" indicates an angle defined between the direction indicating the maximum luminance and a direction in which half of the maximum luminance is indicated when the determination direction is inclined from the maximum luminance direction toward the minute unit lens arrangement direction in a point on the backlight source. In the equation (1), "χ" is preferably not less than 2.5 degrees.

Further, a liquid crystal display device combining this liquid crystal display device II with the above-described liquid crystal display device I also can be made, namely, a liquid crystal display device II wherein the microlens array sheet has at least one diffusion axis in the plane and the direction of the diffusion axis of the microlens array sheet is within about 15 degrees to the direction of the liquid crystal orientation of the liquid crystal cell.

The above-described microlens array sheet is, for example, a one-dimensional microlens array sheet in which minute unit lenses each formed in a stripe-like shape are arranged in one direction. In such a one-dimensional microlens array sheet, the direction of arrangement of stripe-like minute unit lenses is the direction of the diffusion axis.

Further, the above-described liquid crystal cell uses, for example, a twisted nematic liquid crystal. Particularly, in such a twisted nematic liquid crystal, advantages according to the present invention can be remarkably indicated.

Furthermore, the above-described microlens array sheet is formed, for example, by providing a first substance layer and a second substance layer having a refractive index less than the refractive index of the first substance layer between two planes extending parallel to each other and arranging minute unit lenses in a plane, which function as lenses by providing concavities and/or convexities to an interface defined between the first and second substance layers, and such a microlens array sheet is attached so that the second substance layer side of the microlens array sheet is directed to the liquid crystal cell side and the first substance layer side thereof is directed to the observation side.

The above-described liquid crystal display device is suitable particularly as a high definition liquid crystal display device having a pitch of arrangement of the display elements of the liquid crystal cell of not more than 0.4 mm.

BRIEF EXPLANATION OF THE DRAWING

FIG. 17 is a side view of the microlens array sheet shown in FIG. 16 as viewed along arrow X VII of FIG. 13.

FIG. 18 is a schematic enlarged partial plan view showing a still further example of a microlens array sheet used in a liquid crystal display device according to the present invention.

THE BEST MODE FOR CARRYING OUT THE INVENTION

Figure 1:
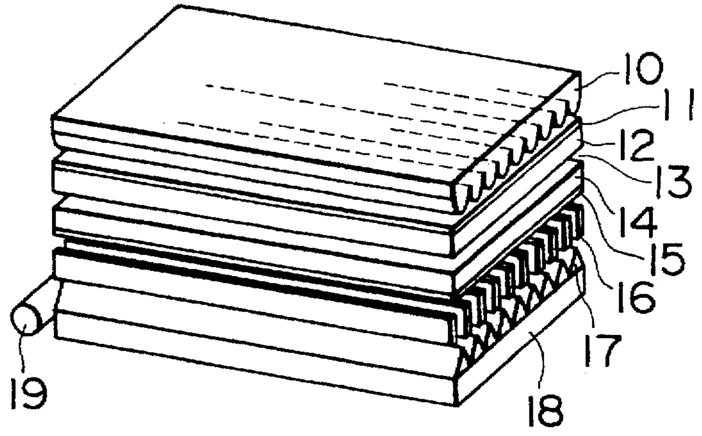
FIG. 1 is a schematic perspective view of a liquid crystal display device according to an embodiment of the present invention.

Hereinafter, preferred embodiments of the present invention will be explained with reference to the drawings.

In the present invention, a "liquid crystal display device" means an image display apparatus in which an image can be directly observed at the exact size thereof, and the image is displayed by means arranged with liquid crystal optical shutters which change ray transmittance or reflectance by utilizing the electro-optical effect of liquid crystal molecules, that is, by utilizing optical anisotropy (anisotropy in refractive index), orientation, flowability and dielectric anisotropy of liquid crystal molecules, applying an electric field or sending an electric current to appropriate display elements and changing the state of orientation of liquid crystal. Further, in the present invention, a "liquid crystal cell" means a body arranged with the liquid crystal optical shutters.

The display element of a liquid crystal cell is the minimum element of content to be displayed on the liquid crystal display device, and, for example, in case of most monochromatic liquid crystal display devices, a single liquid crystal optical shutter corresponds to a display element, and in case of color liquid crystal display devices, a unit formed from three liquid crystal optical shutters indicating the respective primary colors of red, green and blue becomes a display element.

In the present invention, a "microlens array sheet" (hereinafter, also referred to as "MLA") means a sheet in which minute unit lenses, that is, minute unit portions having a lens function (hereinafter, also referred to as "microlens unit" or referred to merely as "lens unit"), are arranged in plane. Where, "minute unit portion" means that an arrangement body (MLA) is sufficiently large relative to the unit portion (unit lens), and in the present invention, when the arrangement body comprises 100 or more unit portions, the unit portion is defined to be minute. Further, "having a lens function" means that it is not necessary to have a predetermined focal point as an ordinary single convex lens or concave lens has, and it may have a function which can refract an entered ray in an appropriate controlled direction. Of course, because a usual, so-called "diffusion plate" or "light scattering plate", to which a light diffusion property is provided by a layer added with particles having a light diffusion property or by random concavities/convexities formed on the surface, scatters an entered ray randomly, such a plate cannot refract a ray in an appropriate controlled direction and it cannot be used in the present invention.

Firstly, the liquid crystal display device I according to the present invention will be explained.

A microlens array sheet used in the liquid crystal display device I according to the present invention has at least one diffusion axis in the plane.

The expression, "having a diffusion axis in the plane" means that a center axis of a direction, in which a ray bundle entering from a linear direction normal to the microlens array sheet is preferentially diffused, exists in the plane of the microlens array sheet. In other words, the microlens array sheet is not isotropic in diffusion property depending on direction in the plane of the microlens array sheet, and the "direction of diffusion axis" means a direction in which the ray bundle is preferentially diffused, that is, the direction in which it is diffused at the widest angle. In a case where ray transmittance or diffusion varies depending on the surface to which the ray bundle enters, the surface by which a greater diffusion property can be indicated is selected.

Further, the "diffusion property of a microlens array sheet" is indicated as follows. When parallel rays are emitted from a linear direction normal to the back surface of the microlens array sheet and the luminance of the transmitted ray bundle is determined from various directions relative to the optical sheet surface, directions indicating a luminance of not less than 50% of the determined maximum luminance are determined as a range of inclined angle relative to the direction normal to the optical sheet surface.

As one type of microlens array sheet, there are one-dimensional microlens array sheets wherein stripe-like microlens units are arranged in one direction, and there are two-dimensional microlens array sheets wherein dome-like microlens units each having a rectangular, triangular or hexagonal bottom surface are arranged lengthwise and crosswise. In most cases, there exists a diffusion axis in the arrangement direction of microlens units (minute unit lenses).

For example, in a case of a microlens array sheet wherein barrel-like cylindrical lens units are arranged one-dimensionally, i.e., in a case of a lenticular lens sheet, the direction of arrangement of the unit lenses is the direction of the diffusion axis. In a case of a microlens array sheet wherein dome-like convex lens units each having a square bottom surface are arranged two-dimensionally, there exist two diffusion axes in the directions of the respective sides of the square unit, i.e., in two directions of arrangement of unit lenses perpendicular to each other. In a case of a microlens array sheet wherein microlens units each having a modified-shape bottom surface with a major axis and a minor axis such as a rectangle are arranged, generally there exists a diffusion axis in the direction of the minor axis of the microlens unit, i.e., in the direction where the pitch of arrangement of the microlens units becomes the smallest.

Among these microlens array sheets, a one-dimensional microlens array sheet wherein stripe-like microlens units are arranged in one direction is preferred from the viewpoint of balance of optical utilization factor and effect for enlarging a visible angle when incorporated into a liquid crystal display device.

Next, a typical structure of the liquid crystal display device I according to the present invention will be schematically shown in FIG. 1.

In FIG. 1, numeral 10 indicates a microlens array sheet. A liquid crystal layer 13 is positioned between upper base plate 12 and lower base plate 14, and outside thereof, upper polarizing plate 11 and lower polarizing plate 15 are provided to form a liquid crystal cell as an optical shutter arrangement body, and the microlens array sheet 10 is attached to the surface of the upper polarizing plate 11. In this embodiment, a backlight source is provided below this liquid crystal cell. Namely, a backlight source comprising a louver sheet 16 for absorbing unnecessary ray bundles, a prism sheet 17, a light-introducing plate 18 and a light source 19 disposed laterally is provided below the liquid crystal cell.

Figure 9:
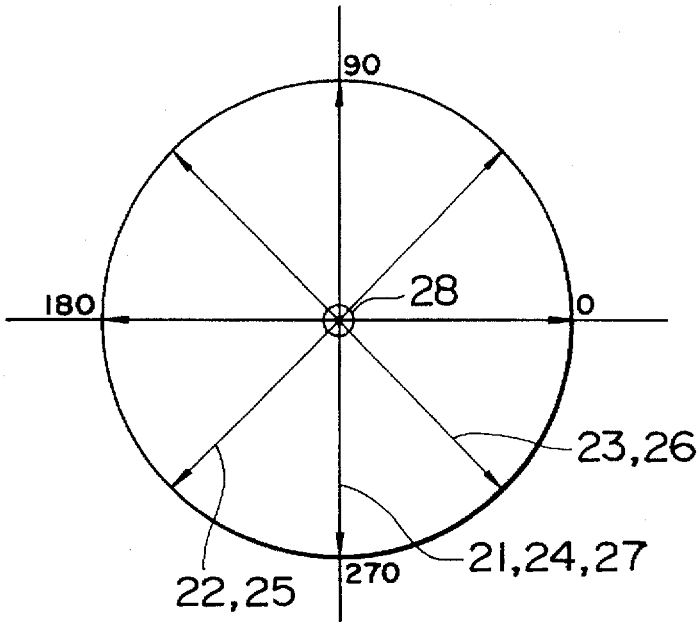
FIG. 9 is an explanation view showing the directional relationship between the optical axes of the respective elements in the liquid crystal display device shown in FIG. 1.

FIG. 9 shows directional relationship between the respective optical elements in the liquid crystal display device shown in FIG. 1.

The direction perpendicular to the surface of the paper depicting FIG. 9 in the center 28 of the figure is defined as a linear direction normal to a scope, and each direction is indicated by an angle of circumference in a plane parallel to the scope. The direction 27 of arrangement of unit lenses of the microlens array sheet and the direction 21 of arrangement of prisms of the prism sheet are oriented in a direction parallel to the direction 24 of orientation of the liquid crystal molecules in the central portion of the liquid crystal layer. Numerals 22 and 25 indicate an absorption-axis direction of the lower polarizing plate and a rubbing direction of the upper base plate, and numerals 23 and 26 indicate a rubbing direction of the lower base plate and an absorption-axis direction of the upper polarizing plate, respectively. In FIG. 9, the direction of the diffusion axis of the microlens array sheet conforms to the direction 27 of arrangement of unit lenses.

In the liquid crystal display device I according to the present invention, such a microlens array sheet is attached such that the direction of the diffusion axis of the microlens array sheet is within about 15 degrees to the direction of the liquid crystal orientation of a liquid crystal cell.

Where, the "direction of the liquid crystal orientation of the liquid crystal cell" is a direction determined by averaging orientation directions of major axes of liquid crystal molecules when the liquid crystal cell with no voltage charge is observed from a linear direction normal to an observation surface, in other words, the direction of the major axis of the refractive index oval when the liquid crystal layer is regarded as one birefringence body. In the case of a twisted nematic liquid crystal, this direction conforms to the average orientation direction of liquid crystal molecules of a liquid crystal layer positioned between two substrate plates, which are present at a position having equal distances from both base plates.

In practice, it is not necessary to conform accurately to an exact direction defined geometrically, and a shift within a range of zero to 10 to 15 degrees can be allowed unless harmful to the purpose of the present invention.

The liquid crystal display device I according to the present invention preferably has a backlight source.

In this case, the property of the backlight source preferably satisfies the equation (1) described later.

By forming such a liquid crystal display device I wherein the direction of a diffusion axis of a microlens array sheet is within about 15 degrees of the direction of liquid crystal orientation of the liquid crystal cell, a liquid crystal display device substantially independent of view angle, even if observed from any direction and having an extremely wide visible angle, can be provided. Moreover, a liquid crystal display device practically completely free from the problem of visible angle can be obtained merely by a simple operation in which a microlens array sheet is attached in a specified direction.

A microlens array sheet is formed as follows.

FIGS. 2 to 5 show examples of shapes in a case where a microlens array sheet used in the liquid crystal display device I according to the present invention is a one-dimensional sheet.

Figure 2:
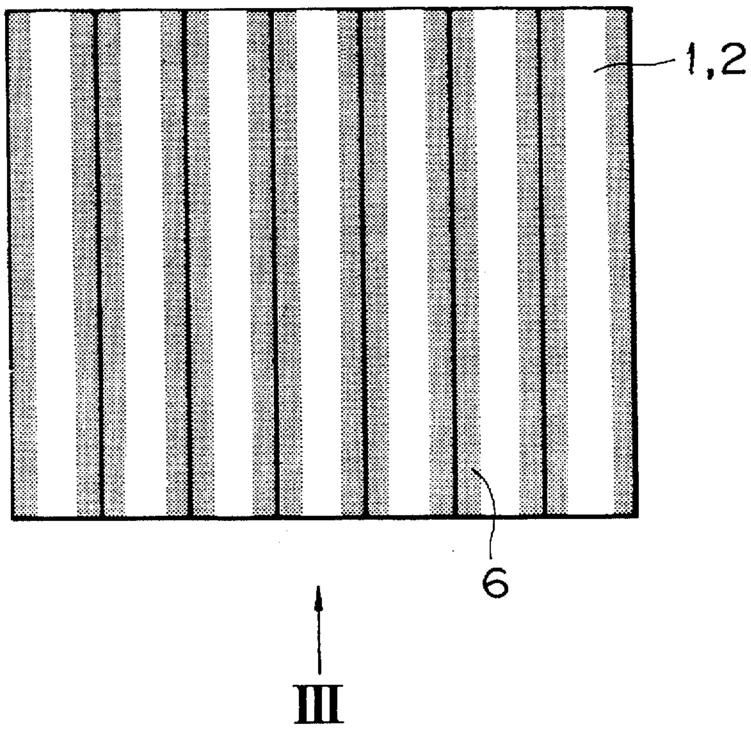
FIG. 2 is a schematic enlarged partial plan view showing an example of a one-dimensional microlens array sheet used in a liquid crystal display device according to the present invention.
Figure 3:
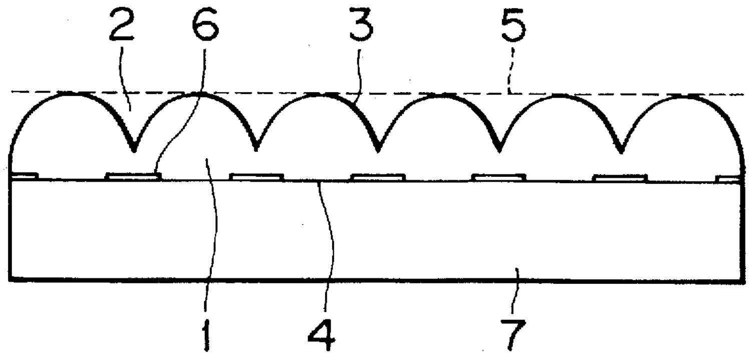
FIG. 3 is a side view of the microlens array sheet shown in FIG. 2 as viewed along arrow III of FIG. 2.
Figure 4:
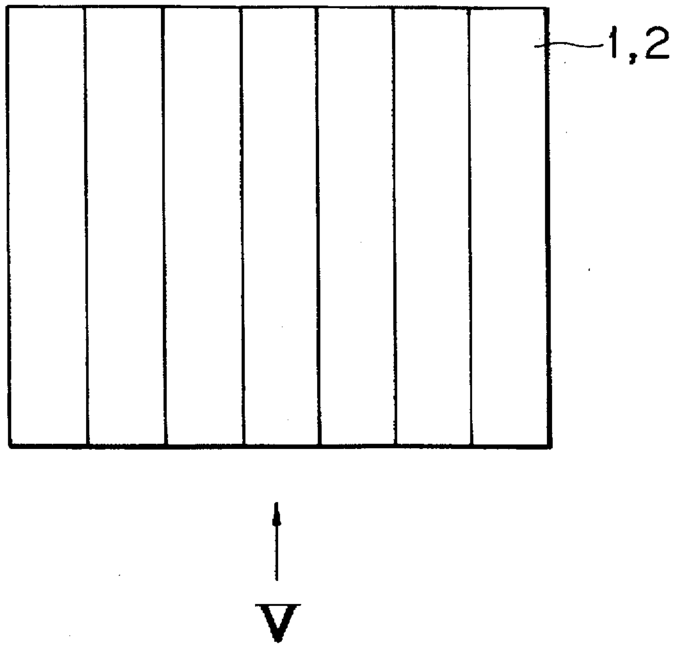
FIG. 4 is a schematic enlarged partial plan view showing another example of a microlens array sheet used in a liquid crystal display device according to the present invention.
Figure 5:
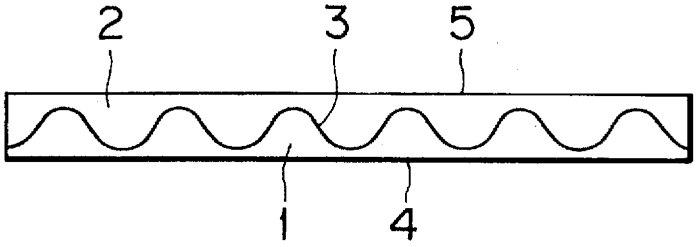
FIG. 5 is a side view of the microlens array sheet shown in FIG. 4 as viewed along arrow V of FIG. 4.

FIGS. 2 and 3 show an example wherein barrel type columnar bodies are arranged in one direction, and ray cut-off layers 6 are formed on the lens arrangement plane in order to suppress reflection of outer rays. FIGS. 4 and 5 show an example of a microlens array sheet wherein an interface between a first substance and a second substance is formed as a continuous curved surface. In such a case of an interface of a continuous curved surface, the interface between the first and second substance layers of the unit lenses has both concave surfaces and convex surfaces. In FIGS. 2 to 5, surfaces 4 and 5 of the first substance layer 1 and the second substance layer 2 different from the interface 3 are formed as planes parallel to each other. Numeral 7 indicates a transparent plastic base plate for maintaining the formation of the microlens array sheet.

In the microlens array sheets shown in FIGS. 2 and 4, the direction of arrangement of unit lenses is a left-hand/right-hand direction of each paper showing each figure.

Figure 6:
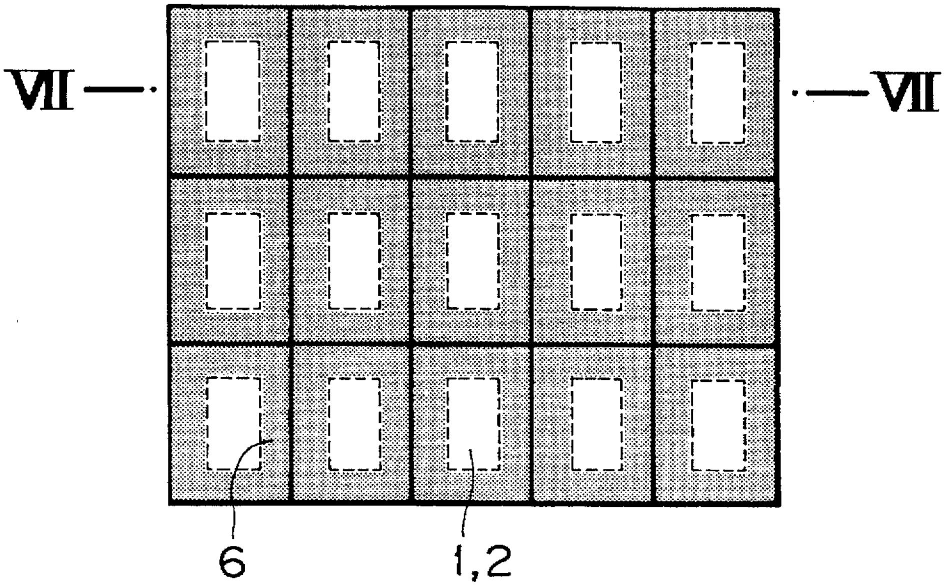
FIG. 6 is a schematic enlarged partial plan view showing an example of a two-dimensional microlens array sheet used in a liquid crystal display device according to the present invention.
Figure 7:
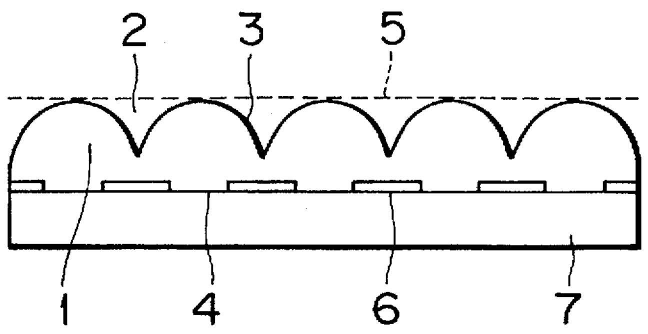
FIG. 7 is a sectional view of the microlens array sheet shown in FIG. 6 as viewed along line VII—VII of FIG. 6.
Figure 8:
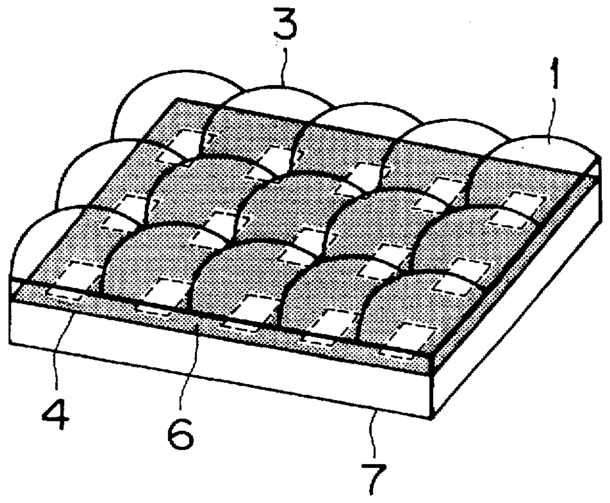
FIG. 8 is a schematic perspective view of the microlens array sheet shown in FIGS. 6 and 7.

FIGS. 6 to 8 show an example of shape in a case where the microlens array sheet used in the present invention is a two-dimensional sheet. In this embodiment, dome-like unit lenses each having a rectangular bottom surface are arranged two-dimensionally. Ray cut-off layers 6 are formed on the lens arrangement plane to suppress reflection of outer rays similarly in a case of the one-dimensional microlens array sheet shown in FIGS. 2 and 3.

Next, the liquid crystal display device II according to the present invention will be explained.

In the liquid crystal display device II according to the present invention, it is an important factor that the relationship between the directivity of light emission of the backlight source and the pitch of arrangement of display elements of the liquid crystal cell in a minute unit lens arrangement direction is controlled in a specified range.

Namely, the following equation (1) is satisfied.

$$p \geqq d \tan \chi \qquad (1)$$

Where, "p" (mm) indicates a length of a display element of the liquid crystal cell in the minute unit lens arrangement direction, that is, the pitch of arrangement of the display elements. As aforementioned, when the liquid crystal cell forms the minimum display element with a plurality of pixels for a purpose such as color display, this is defined as the display element. "d" (mm) indicates a distance from a liquid crystal layer to the minute unit lenses. "$\chi$" indicates the angle between direction indicating the maximum luminance and the direction in which half of the maximum luminance is indicated when the determination direction is inclined from the maximum luminance direction toward the minute unit lens arrangement direction in a point on the backlight source (hereinafter, this angle is also referred to as "directive angle of backlight source".). Further, in the present invention, the distance of d (mm) from a liquid crystal layer to the minute unit lenses means the distance between the liquid crystal layer and a point of concavities/convexities surface of the microlens array sheet which is the closest to the liquid crystal layer.

In other words, the above-described equation (1) defines broadening condition of a ray bundle emitted from a backlight source in accordance with the structure of a liquid crystal cell to be combined. Thus, when the directivity of a backlight source is set within the range defined by the equation (1), deterioration of image due to attachment of a microlens array sheet can be suppressed minimum, it can be suppressed to a level with no problem in practice, and at the same time, a liquid crystal display device having a high image quality and wide visible angle, which cannot be achieved by the conventional technologies, can be obtained by the microlens array sheet.

As the items with respect to displayed image quality of a liquid crystal display device, further there are "smoothness" and "clearness" of image. Namely, "smoothness" means a degree which does not let an observer feel that a displayed image is an aggregate of display elements, and "clearness" means a degree of sharpness of an edge, for example, when a straight line is displayed.

The "smoothness" and "clearness" include factors contrary to each other, and a preferentially selected image quality is decided depending upon use of a liquid crystal display device.

In a case where the liquid crystal display device according to the invention is employed for use in which "smoothness" is to be preferentially selected, it is preferred that the following equation (2) is satisfied within the range defined by the equation (1).

$$4d \tan \chi \geqq p \geqq d \tan \chi \qquad (2)$$

where, symbols used in the equation (2) are the same as those used in the equation (1).

In a case where the liquid crystal display device according to the invention is employed for use in which "clearness" is to be preferentially selected, preferably the following equation (3) is satisfied.

$$p \geqq 2d \tan \chi \qquad (3)$$

where, symbols used in the equation (3) are the same as those used in the equation (1).

As introduced from the equations (2) and (3), it is understood that the following equation (4) may be satisfied in order to show both "smoothness" and "clearness".

$$4d \tan \chi \geqq p \geqq 2d \tan \chi \qquad (4)$$

where, symbols used in the equation (4) are the same as those used in the equation (1).

In a liquid crystal display device, in order to indicate advantages originally provided to a liquid crystal displaying method such as thin structure, light weight and low demand, it is preferred that a backlight source to be incorporated that also has properties which do not detract from such advantages. From this point of view, it is preferred that a backlight source having a structure as simple as possible is used so long as the image quality is not damaged, and it is sufficient if the following equation (5) is satisfied.

$$15d \tan \chi \geqq p \qquad (5)$$

where, symbols used in the equation (5) are the same as those used in the equation (1).

Namely, use of a backlight source having a very high directivity such as one out of the range of the equation (5) is not preferred because the liquid crystal display device becomes unnecessarily complicated, the display property of the device is not improved, and the advantages of liquid crystal display device such as thinness and light weight are injured.

In a case where a liquid crystal display device is required to have a visible angle of not less than ±40 degrees in the unit lens arrangement direction of a microlens array sheet, it is preferred that the directive angle "$\chi$" of a backlight source is not less than 2.5 degrees, preferably not less than 5 degrees. If "$\chi$" is less than 2.5 degrees, an extremely high-level accuracy is required in design and manufacture of a microlens array sheet for achieving a visible angle of not less than ±40 degrees, and it becomes difficult to obtain a uniform visible-angle property.

The above-described equations (1) to (5) can be satisfied by controlling the setting position of a microlens array sheet and the directivity of a backlight source to adequate position and directivity in accordance with the structure of a liquid crystal cell used in a liquid crystal display device.

From the equation (1), it is understood that a microlens array sheet is preferred to be set as closely as possible to a liquid crystal cell. Namely, it is preferred that the microlens array sheet is mounted on the observation surface of the liquid crystal cell so as to be brought into contact with the surface. However, in usual cases, even if a microlens array sheet is brought into contact with a liquid crystal cell, because there are optical elements such as a substrate plate supporting a liquid crystal layer and a polarizing plate and further adhesive layers for holding the plates and the microlens array sheet between the liquid crystal layer and the lens surface of the microlens array sheet, in practice it is impossible to make "d" of the equation (1) zero, and generally a gap of about 0.3 to 1.5 mm exists.

Therefore, in the liquid crystal display device II according to the present invention, it is preferred that a microlens array sheet is attached in a condition close to a liquid crystal cell as well as the directivity of a backlight source is adequately set. For example, in a case using a liquid crystal cell having display elements arranged at a pitch of 0.4 mm lengthwise and crosswise, a microlens array sheet is attached in a condition close to the liquid crystal cell, and in this case, if there exists a gap of 1.2 mm between the liquid crystal layer and the lens surface of the microlens array sheet, it is understood that the directive angle of the backlight source satisfying the equation (1) is not more than about 18.4 degrees.

In order to constitute a backlight source having such a directivity, a method for using a Fresnel lens, a Fresnel prism, a microlens array or a fine reflecting mirror element array for a ray bundle emitted from a light source such as a fluorescent tube, a method for using a multireflector combined with minute reflecting surfaces as a reflecting mirror, a method for absorbing unnecessary ray bundles by an optical fiber sheet or louver can be applied, but the method is not restricted by these methods.

In a case where of the microlens array sheet is a one-dimensional microlens array sheet, the directivity of a backlight source in a direction perpendicular to the unit lens arrangement direction is not particularly restricted.

In a preferred embodiment of the liquid crystal display device II according to the present invention, the liquid crystal display device is a display device of twisted nematic mode, a one-dimensional microlens array sheet is used as the microlens array sheet, the unit lens arrangement direction of the microlens array sheet is conformed to a direction determined by projecting a direction of orientation of liquid crystal molecules present at a central portion of the twisted nematic liquid crystal layer in the thickness direction thereof onto the display surface when a voltage is not applied, and a backlight source has a directive angle in the unit lens arrangement direction satisfying the above-described equations (1) to (5) and has a directive angle in a direction perpendicular to the unit lens arrangement direction of not less than 30 degrees. By such a constitution, in practice, a liquid crystal display device having a display performance independent of view angle even if observed from any direction such as upper or lower, left-hand or right-hand or oblique upper or lower direction can be realized.

Figure 21:
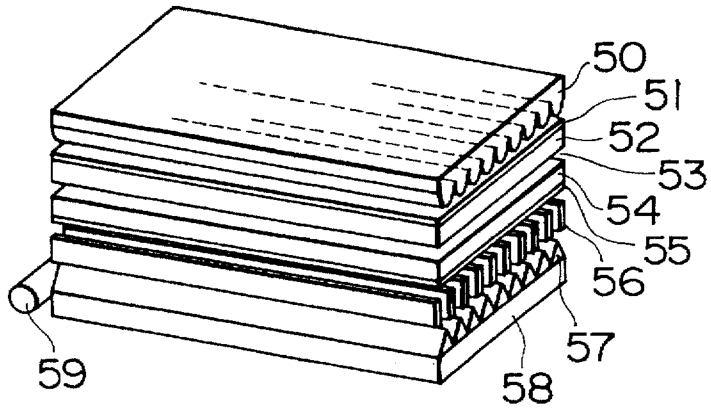
FIG. 21 is a schematic perspective view of a liquid crystal display device according to an embodiment of the present invention.

Next, the liquid crystal display device II according to the present invention will be explained in more detail, and a typical structure thereof is shown in FIG. 21.

The structure shown in FIG. 21 is basically the same as that shown in FIG. 1. Namely, in FIG. 21, numeral 50 indicates a microlens array sheet. A liquid crystal layer 53 is positioned between upper base plate 52 and lower base plate 54, and outside thereof, upper polarizing plate 51 and lower polarizing plate 55 are provided to form a liquid crystal cell as an optical shutter arrangement body, and the microlens array sheet 50 is attached to the surface of the upper polarizing plate 51. In this embodiment, a backlight source is provided below this liquid crystal cell. Namely, a backlight source comprising a louver sheet 56 for absorbing unnecessary ray bundles, a prism sheet 57, a light-introducing plate 58 and a light source 59 disposed laterally is provided below the liquid crystal cell.

Figure 22:
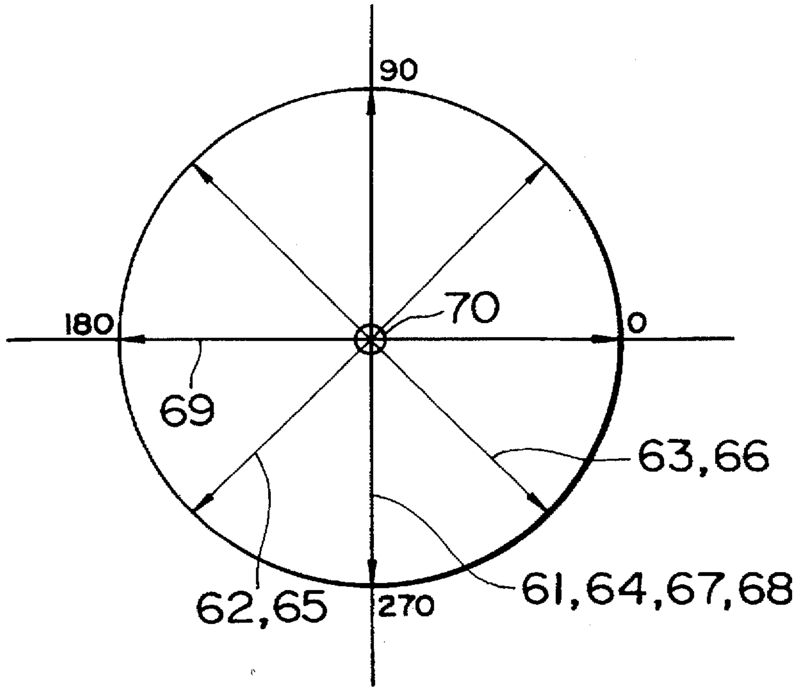
FIG. 22 is an explanation view showing the directional relationship between the optical axes of the respective elements in the liquid crystal display device shown in FIG. 21.

FIG. 22 shows directional relationship between the respective optical elements in the liquid crystal display device shown in FIG. 21.

A direction perpendicular to the surface of the paper depicting FIG. 22 in a center 28 of the figure is defined as the linear direction normal to a scope, and each direction is indicated by an angle of circumference in a plane parallel to the scope. The direction 64 of orientation of liquid crystal molecules at a central portion of the liquid crystal layer is set in the vertical direction 68 of the scope, and the unit lens arrangement direction 67 of the microlens array sheet and the prism arrangement direction 61 of the prism sheet are set in a direction parallel to the direction 68. Numerals 62 and 65 indicate the absorption-axis direction of the lower polarizing plate and the rubbing direction of the upper base plate, and numerals 63 and 66 indicate the rubbing direction of the lower base plate and the absorption-axis direction of the upper polarizing plate, respectively.

FIGS. 11 to 20 schematically show typical shapes of microlens array sheets used in the liquid crystal display device II according to the present invention.

Figure 11:
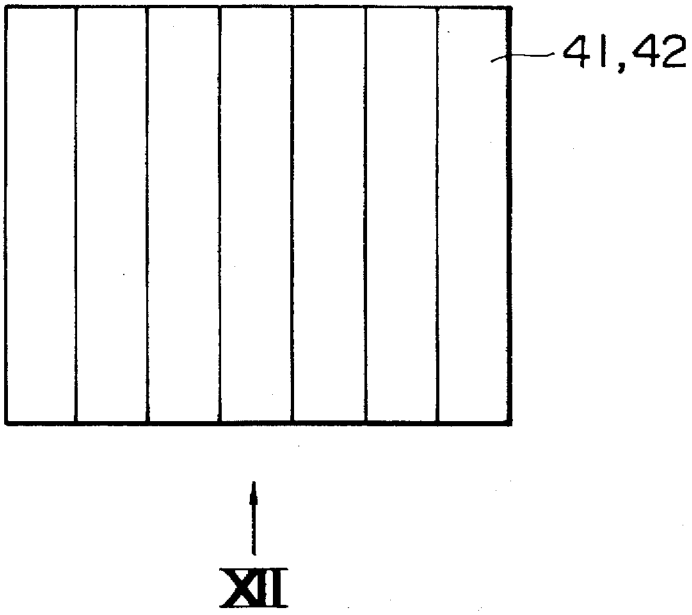
FIG. 11 is a schematic enlarged partial plan view showing an example of a microlens array sheet used in a liquid crystal display device according to the present invention.
Figure 12:
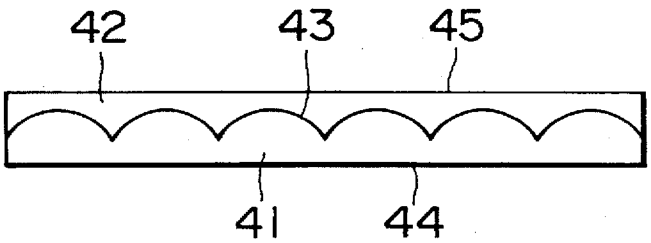
FIG. 12 is a side view of the microlens array sheet shown in FIG. 11 as viewed along arrow X II of FIG. 11.
Figure 13:
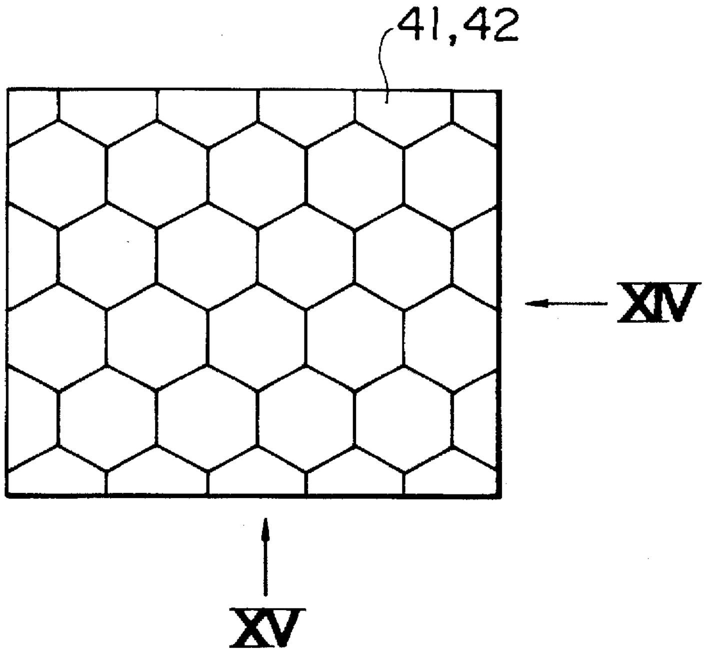
FIG. 13 is a schematic enlarged partial plan view showing another example of a microlens array sheet used in a liquid crystal display device according to the present invention.
Figure 14:
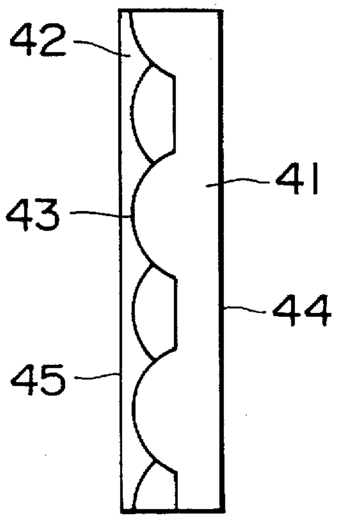
FIG. 14 is a side view of the microlens array sheet shown in FIG. 13 as viewed along arrow X IV of FIG. 13.
Figure 15:
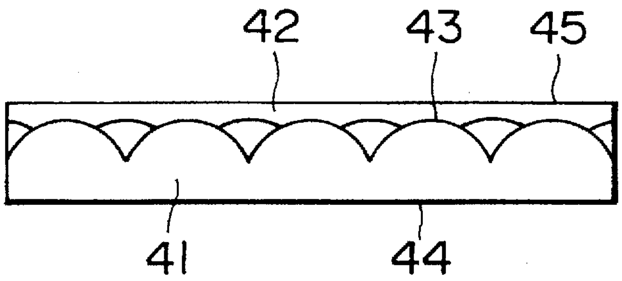
FIG. 15 is a side view of the microlens array sheet shown in FIG. 13 as viewed along arrow X V of FIG. 13.
Figure 16:
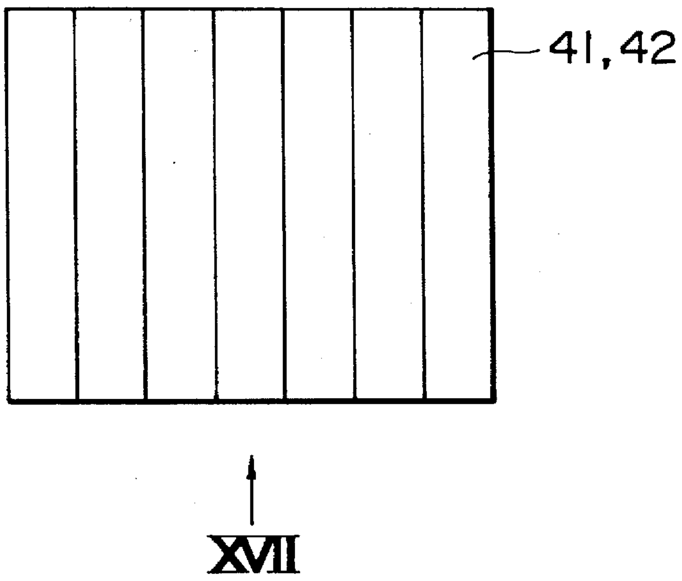
FIG. 16 is a schematic enlarged partial plan view showing a further example of a microlens array sheet used in a liquid crystal display device according to the present invention.
Figure 19:
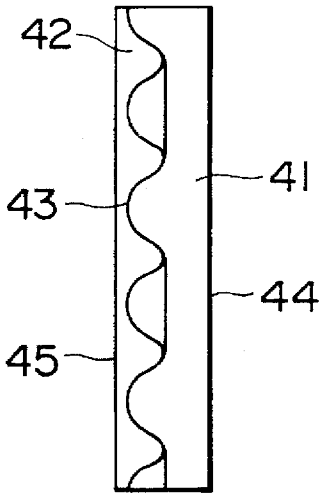
FIG. 19 is a side view of the microlens array sheet shown in FIG. 18 as viewed along arrow X IX of FIG. 18.
Figure 20:
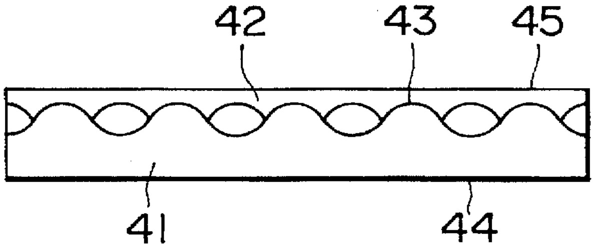
FIG. 20 is a side view of the microlens array sheet shown in FIG. 18 as viewed along arrow X X of FIG. 18.

FIGS. 11 and 12 show an example of a one-dimensional microlens array sheet wherein barrel type columnar bodies are arranged in one direction. In the figures, numeral 41 indicates a first substance layer of the microlens array sheet, numeral 42 indicates a second substance layer thereof, numeral 43 indicates a concavities/convexities plane as an interface therebetween, numeral 44 indicates a surface of the first substance layer and numeral 45 indicates a surface of the second substance layer, respectively. FIGS. 13 to 15 show an example of a two-dimensional microlens array sheet wherein dome-like bodies each having a rectangular bottom surface are arranged lengthwise and crosswise. Further, FIGS. 16 to 20 show examples of one-dimensional and two-dimensional microlens array sheets wherein an interface between a first substance and a second substance is formed as a continuous curved surface, and FIGS. 16 and 17 show an example having a wave-form shape and FIGS. 18 to 20 show an example having a hexagonal shape. In such an interface of continuous curved surface, the interface between the first and second substance layers has both concave surfaces and convex surfaces. In FIGS. 11 to 20, surfaces 44 and 45 of the first substance layer 41 and the second substance layer 42 different from the interface 43 are formed as planes parallel to each other.

In the one-dimensional microlens array sheets shown in FIGS. 11 and 16, the direction of arrangement of unit lenses is a left-hand/right-hand direction of each paper showing each figure. In the two-dimensional microlens array sheets shown in FIGS. 13 and 18, the direction of arrangement of unit lenses is a freely selected two axial directions perpendicular to each other in each paper showing each figure.

A one-dimensional microlens array sheet is used in a case where a visible angle in one direction of a display scope such as a vertical direction or a left-hand/right-hand direction of the scope) among visible angles of a liquid crystal cell combined is required to be enlarged. For example, in a case where a liquid crystal cell is a twisted nematic type liquid crystal cell having a wide visible angle in one direction, a liquid crystal display device having a wide visible angle in any direction can be obtained by combining a one-dimensional microlens array sheet arranged with unit lenses in a direction perpendicular to the one direction of the liquid crystal cell. Further, in a case where use of a liquid crystal display device requires a wide visible angle only in one direction, a one-dimensional microlens array sheet having unit lenses arranged in the required direction of visible angle may be used.

A liquid crystal display device having a wide visible angle and high image quality, which has not been realized by the conventional technologies, can be obtained by the above-described liquid crystal display device II having a specified relationship between the directivity of light emission of a backlight source and the pitch of arrangement of display elements in a direction of arrangement of minute unit lenses. By this, the problems on image quality of a liquid crystal display device can be solved, the restriction of conditions for use due to a small range of visible angle can be released, and therefore, not only the conventional dissatisfactions can be improved but also a development for new uses becomes possible.

Next, microlens array sheets used for the liquid crystal display device I and the liquid crystal display device II according to the present invention will be explained in more detail.

In a microlens array sheet used for the liquid crystal display device according to the present invention, it is preferred that unit lenses function as lenses by providing concavities and/or convexities to an interface between a first substance layer and a second substance layer having a refractive index smaller than that of the first substance layer which are positioned between two planes parallel to each other.

Where, the "plane" means a surface substantially flat relative to the interface having concavities and/or convexities which function as lenses. In the present invention, the plane is defined as a plane having a mean roughness Ra of not more than 1/5 of the height of the interface having concavities and/or convexities. The "parallel" means a condition substantially in parallel to the arrangement plane of concavities and/or convexities.

A first substance constituting the first substance layer and a second substance constituting the second substance layer are both substantially transparent substances. A glass material and a plastic transparent material are preferably used as the first substance. As the second substance, a material having a refractive index less than that of the first substance may be used, in addition to a glass material and a plastic transparent material, a liquid such as water and a gas such as an air can be used.

The two layers composed of such first and second substances are positioned between two planes parallel to each other. The interface thereof is formed as a surface having concavities and/or convexities. By such a formation, when constructed as a liquid crystal display device, a good effect for enlarging the visible angle can be obtained.

In the assembly, it is preferred that the second substance layer side (side of a substance layer having a lower refractive index) of the microlens array sheet is directed to the side of a liquid crystal cell and the first substance layer side (side of a substance layer having a higher refractive index) thereof is directed to the observation side. By this, a great effect for enlarging the visible angle can be obtained.

Further, a particularly large visible angle can be obtained when the maximum refractive index of unit lenses of a microlens array sheet used in the present invention is not less than 30 degrees.

When a smaller angle among two angles defined by intersection of a tangent plane at a certain point on the interface having concavities and/or convexities and the lens arrangement plane is referred to as "θ" and a point present on the interface making the "θ" a maximum value "θ max" is referred to as a point A, the above-described maximum refractive index is defined as an angle between a) a direction of ray indicated when a ray having reached the point A after entering into the microlens array sheet from a linear direction normal to a lens arrangement plane present on the second substance layer side exits into an atmosphere from a surface present on the first substance layer side after transmitting through the first substance layer and b) the direction normal to the lens arrangement plane.

In the liquid crystal display device according to the present invention, although it is one of constitutional conditions that a microlens array sheet such as the above-described one is attached to the observation surface of a liquid crystal cell, depending upon structure of a microlens array sheet and use environment of a liquid crystal display device, the displayed image of the liquid crystal display device may be hard to be observed by a condition where outer rays entering from the observation surface of the liquid crystal display device reflect at a surface having concavities and/or convexities. In such a case, the microlens array sheet can be provided with an appropriate anti-reflection property for outer rays.

As methods for providing such an anti-reflection property, the following methods can be employed, but it is not restricted by these methods.

(1) A method for cutting the outer rays off by painting an appropriate portion with a black color which is not present on the path of the image rays entering from a liquid crystal cell into the microlens array sheet but present on the reflection path of the outer rays. Such an "appropriate portion which is not present on the path of the image rays" is not a portion through which any beam radiated from the liquid crystal cell does not pass but a portion through which a beam required for making a good image among the beams radiated from the liquid crystal cell does not pass.

(2) A method for applying a non-reflecting coating such as an optical multi-layer thin film.

(3) A method for coloring the respective unit lenses of the microlens array sheet and reducing the influence due to the reflection of the outer rays utilizing the fact that the reflection path length of the outer rays is longer than the optical path length for an image.

(4) A method for bringing the tip portions of the convex portions of the first substance layer in the unit lenses of the microlens array sheet into contact with the liquid crystal cell and transmitting the outer rays directly into the interior of the liquid crystal cell.

(5) A method for providing another substance layer (1') having a refractive index more than that of the first substance layer on the surface of the first substance layer with the concavities and convexities and enclosing the outer rays in the substance layer (1').

In the above method (5), although there are portions at which the interface between the first and second substance layers specified by the present invention as another constitutional factor does not exist, in the present invention, the interface defined between the above-described another layer provided on the first substance layer and the second substance layer provides an interface within the invention.

Among the above methods, the methods (1), (4) and (5) are preferred from the viewpoint of the effect obtained, and further, the method (1) is particularly preferred.

As a concrete embodiment, a method can be employed wherein ray cut-off layers are disposed in an area defined by projecting an area of concavities/convexities plane, in which an angle between a linear line normal to the unit lens arrangement plane and the concavities/convexities plane is over a critical angle of reflection, onto the unit lens arrangement plane.

Particularly, in a case where a microlens array sheet is formed by positioning a first substance layer and a second substance layer having a refractive index smaller than that of the first substance layer between two planes parallel to each other, and providing a periodic concavities/convexities configuration to an interface between the first and second substance layers to form a layer arranged with optically convex unit lenses, it is preferred that any of, or two or three of the following conditions (1) to (3) are satisfied as the position of the ray cut-off layer.

(1) When a microlens array sheet is observed from a linear direction normal to the first substance layer-side unit lens arrangement plane, an area over the critical angle of reflection of the concavities/convexities plane is covered with a ray cut-off layer (hereinafter, this condition is referred to as "condition (1)").

(2) An end portion of the ray cut-off layer is present at a position nearer to the concavities/convexities plane than a point of intersection of two rays which are entered from the second substance layer side in parallel to a linear direction normal to the unit lens arrangement plane and thereafter are refracted most greatly at positions of both edge portions of a unit lens or the vicinity thereof (hereinafter, this condition is referred to as "condition (2)").

(3) Rays having a refractive angle of not more than 20 degrees at the concavities/convexities plane of the unit lenses among rays entered from the second substance layer side in parallel to a linear line normal to the unit lens arrangement plane do not pass through ray cut-off layers (hereinafter, this condition is referred to as "condition (3)").

Where, "optically convex unit lens" means a lens configuration wherein the concavities/convexities plane of the unit lenses is formed such that, as the angle indicted between the unit lens arrangement plane of the side of the first substance layer made of a higher refractive-index substance and a tangent plane at a certain point on the concavities/convexitie s plane becomes greater, the concavities/convexities plane is positioned more nearly to the unit lens arrangement plane of the first substance layer side. Here, it is allowed that a portion which is not optically convex, i.e., a portion which is parallel to the unit lens arrangement plane, or a portion which is optically concave is included, as long as it is within a range of 20% of the width of each unit lens.

Further, "ray cut-off layer" means a layer having a function absorbing and/or reflecting a ray which is directed so as to pass the position of the layer, and it is preferably a layer absorbing visible rays from the viewpoint of appearance when made as a liquid crystal display device.

Although such a ray cut-off layer can be constituted from a known material such as a metal film and an oxide thereof, or a resin composition added with a pigment or a dye, it is preferably a layer formed from a resin composition added with a pigment or a dye among these materials and capable of absorbing visible rays from the viewpoint of appearance when made as a liquid crystal display device.

The color tone of a ray cut-off layer is preferred to be substantially black. In order to obtain such a color tone, a layer of a resin composition added with a pigment such as carbon black or titanium black or a black dye is appropriately used. Further, in a case using a dye, it is preferred to use a black dye having a sunshine fastness of not less than 5 from the viewpoint of light resistance etc., and furthermore, it is the most preferred to use an azo-type black dye from the viewpoint of dispersibility, dissolvability, generality, etc.

As the shape of a ray cut-off layer, any one such as a flat film-like shape or a triangular columnar shape can be employed.

The ray cut-off function of a ray cut-off layer is indicated at an average of the whole of the ray cut-off layer from the viewpoint of effective utilization of a ray bundle from a liquid crystal cell combined, and it is preferably not less than 0.5% as a mean transmittance of visible rays after correction of visual sensitivity, and preferably not more than 20%, more preferably not more than 10%, from the viewpoint of suppressing reflection of outer rays.

The ray cut-off layer is preferably provided at a position closer to the first substance layer side than the position of the concavities/convexities plane. When the sectional shape of a ray cut-off layer is not a flat film-like shape but a modified shape such as a triangular or reversed T shape, there is a case where a part of the ray cut-off layer comes into contact with the concavities/convexities plane or projects to the second substance layer side. In such a case, however, it is preferred that at least the most wide portion of the ray cut-off layer exists in the first substance layer side and the ray cut-off layer does not contact with the concavities/convexities plane at the portion.

Next, the conditions (1) to (3) will be explained.

The condition (1) is that an area over the critical angle of reflection of the concavities/convexities plane is covered with a ray cut-off layer when a microlens array sheet is observed from a linear direction normal to the first substance layer-side unit lens arrangement plane.

Where, the unit lens arrangement plane means two planes parallel to each other between which a first substance layer and a second substance layer are positioned, and there are a first substance layer-side unit lens arrangement plane and a second substance layer-side unit lens arrangement plane. In a case where air is used as the second substance, the second substance layer-side unit lens arrangement plane is a hypothetical plane in the atmosphere which does not intersect with the concavities/convexities plane and is parallel to the first substance layer-side unit lens arrangement plane.

"Area over the critical angle of reflection of the concavities/convexities plane" means an area where, when a ray reaches the concavities/convexities plane after entering into the microlens array sheet from the first substance layer-side and goes in the first substance layer in a direction parallel to a linear direction normal to the unit lens arrangement plane, an angle between the ray going direction and a line normal to the concavities/convexities plane is over the critical angle of reflection determined base on the difference between the refractive indexes of the first and second substances.

Further, the critical angle of reflection "θ c" is provided by the following equation (6).

$$\sin(\theta c) = n2/n1 \quad (6)$$

Where, n2 is a refractive index of a lower refractive-index substance and n1 is a refractive index of a higher refractive-index substance.

Next, the condition (2) is that an end portion of the ray cut-off layer is present at a position nearer to the concavities/convexities plane than a point of intersection of two rays which are entered from the second substance layer side in parallel to a linear direction normal to the unit lens arrangement plane and thereafter are refracted most greatly at positions of both edge portions of a unit lens or the vicinity thereof.

In a microlens array sheet arranged with optically convex unit lenses, the inclination of the concavity/convexity of a unit lens becomes greater as approaching each edge portion of the unit lens, and the rays entering from the second substance layer side in parallel to a linear direction normal to the unit lens arrangement plane are most greatly refracted ideally at just the edge portions. In practical use, also there is a case where the rays are refracted most greatly at portions slightly inside of the edge portions from restriction on manufacturing process.

Two rays refracted most greatly at positions of both edge portions of the concavity/convexity plane or the vicinity thereof, after passing through the concavity/convexity plane, progress toward the interior of each unit lens and intersect at a certain point P. It is preferred that the end portion of the ray cut-off layer is present at a position nearer the concavity/convexity plane than this point of intersection P. More preferably, the whole of the ray cut-off layer is present at a position nearer the concavity/convexity plane than the point of intersection P. Where, "to be present at a position nearer the concavity/convexity plane than the point of intersection P" means a condition of existence in a space including the point of intersection P and positioned between a flat plane parallel to the unit lens arrangement plane and the concavities/convexities plane.

By satisfying these conditions (1) and (2), the function of the ray cut-off layer suppressing reflection of outer rays can be achieved.

In a case where a unit lens is symmetric, a refractive angle of the most greatly refracted ray at one edge portion of the concavity/convexity plane becomes the same as a refractive angle of the most greatly refracted ray at the other edge portion, and the point of intersection P is present on a center line of the unit lens. In a case where a unit lens is nonsymmetric, there is a case where a refractive angle of the most greatly refracted ray at one edge portion of the concavity/convexity plane is different from a refractive angle of the most greatly refracted ray at the other edge portion, and in such a case, the point of intersection P does not meet with a center line of the unit lens.

The condition (3) is that rays having a refractive angle of not more than 20 degrees at the concavities/convexities plane of the unit lenses among rays entered from the second substance layer side in parallel to a linear direction normal to the unit lens arrangement plane do not pass through ray cut-off layers.

The rays entered from the second substance layer side in parallel to a linear direction normal to the unit lens arrangement plane are refracted depending upon the difference between the refractive indexes of the first and second substances and the inclination of the concavities/convexities plane when they reach the concavities/convexities plane, and thereafter progress into the first substance. In such a condition, there are various rays having angles of zero degree to several tens degrees as refractive angles at the concavities/convexities plane depending on the configuration of the concavities/convexities plane. The condition (3) means that ray cut-off layers are disposed at positions such that rays refracted at an angle of not more than 20 degrees among these rays, in other words expressing conceptually, a group of rays having passed through portions except the edge portions of the unit lenses or the vicinity thereof on the concavities/convexities plane, do not reach the ray cut-off layers when the rays progress in the first substance.

By satisfying this condition (3), a microlens array sheet having a good efficiency can be realized while using unit lenses capable of obtaining a great advantage for enlarging a visible angle.

A more preferred range of the condition (3) is a range in which rays having a refractive angle of not more than 25 degrees at the concavities/convexities plane of the unit lenses among rays entered from the second substance layer side in parallel to a linear direction normal to the unit lens arrangement plane do not pass through ray cut-off layers. By this condition, the dependency on visible angle of a liquid crystal display device in the unit lens arrangement direction can be completely solved.

Since there may be a case where all the above-described conditions (1) to (3) cannot be satisfied because of a shape of lens, design is performed in consideration of shape of unit lenses and a material forming them.

Hereunder, the conditions (1) to (3) will be explained referring to the drawings.

Figure 25:
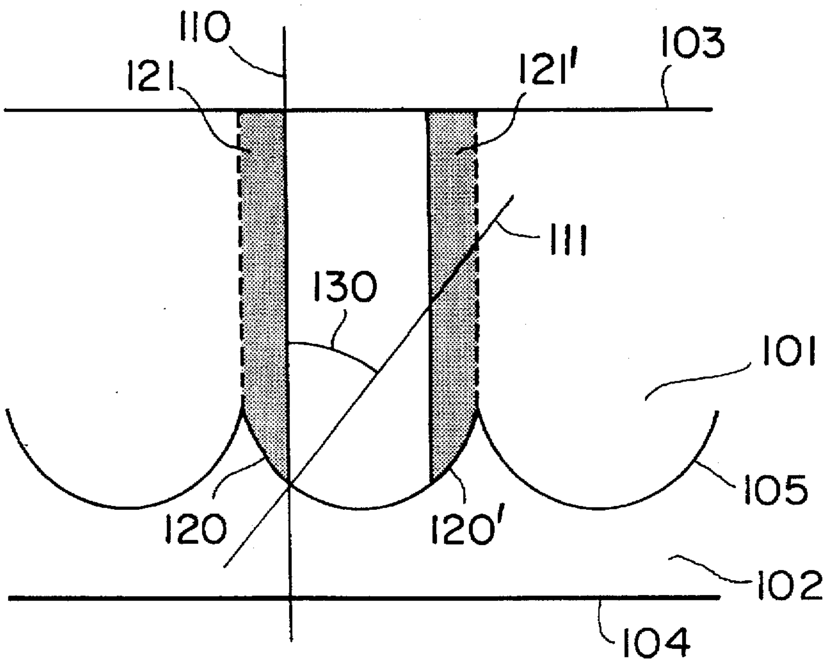
FIG. 25 is a schematic sectional view of a microlens array sheet for explaining a condition (1).

FIG. 25 shows an example of a preferred shape of unit lenses of a microlens array sheet. A first substance layer 101 and a second substance layer 102 are positioned between a first substance layer-side unit lens arrangement plane 103 and a second substance layer-side unit lens arrangement plane 104 which are planes parallel to each other, and an interface therebetween is formed as a concavities/convexities plane 105 which has a convex configuration. In this unit lens, when a material having a refractive index of 1.49 is used as the first substance and a material having a refractive index of 1.00 is used as the second substance, the critical angle of reflection θ c is about 42.2 degrees.

Firstly, the condition (1) will be explained.

When this unit lens is observed from a direction of a line 110 normal to the first substance layer-side unit lens arrangement plane, the areas over the critical angle of reflection of the concavities/convexities plane are an area 120 and an area 120' on the concavities/convexities plane 105 where an angle 130 defined between the line 110 and a line 111 normal to the concavities/convexities plane 105 at the point of intersection of the line 110 and the concavities/convexities plane 105 becomes not less than 42.2 degrees. In order to satisfy the condition (1), the areas 120 and 120' must be covered with ray cut-off layers. Namely, it is necessary that ray cut-off layers are disposed so as to cross the areas 120 and 120' shown in FIG. 25, respectively.

Next, the condition (2) will be explained.

Figure 26:
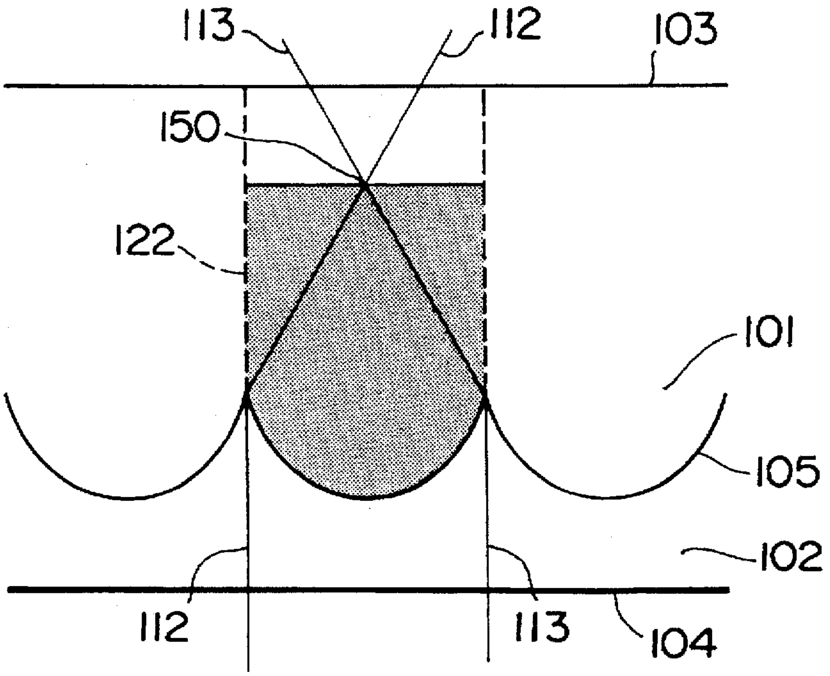
FIG. 26 is a schematic sectional view of a microlens array sheet for explaining a condition (2).

FIG. 26 shows unit lenses similarly in FIG. 25. In this unit lens, the rays refracted most greatly at the edge portions or the vicinity thereof are a ray 112 and a ray 113 passing through the respective edge portions of the unit lens, and these two rays intersect at a point of intersection 150. In order to satisfy the condition (2), an end portion of a ray cut-off layer must be present at a position nearer the concavities/convexities plane than the point of intersection 150. Further, since it is required that the widest portion is present at a position of the first substance layer side, the end portion of the ray cut-off layer must be present within a range 122 shown in FIG. 26.

Furthermore, the condition (3) will be explained.

Figure 27:
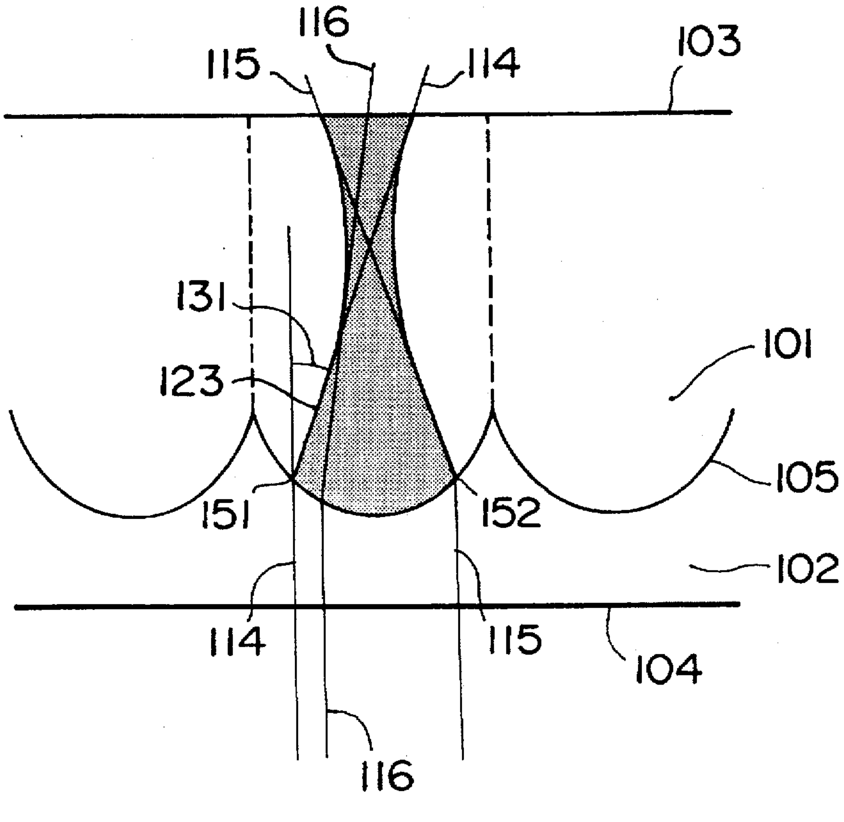
FIG. 27 is a schematic sectional view of a microlens array sheet for explaining a condition (3).

FIG. 27 also shows unit lenses similarly in FIG. 25. In this unit lens, rays having a refractive angle 131 of 20 degrees at the concavities/convexities plane 105 among rays entered from the second substance layer side in parallel to a linear direction normal to the unit lens arrangement plane 104 are a ray 114 and a ray 115 passing through a point 151 and a point 152 present on the concavities/convexities plane. Any of rays passing through the portion of the concavities/convexities plane present between the points 151 and 152 has a refractive angle of not more than 20 degrees, and these rays pass through an area 123. In order to satisfy the condition (3), since these rays must not pass through a ray cut-off layer, any part of the ray cut-off layer must not exist in the area 123.

Figure 24:
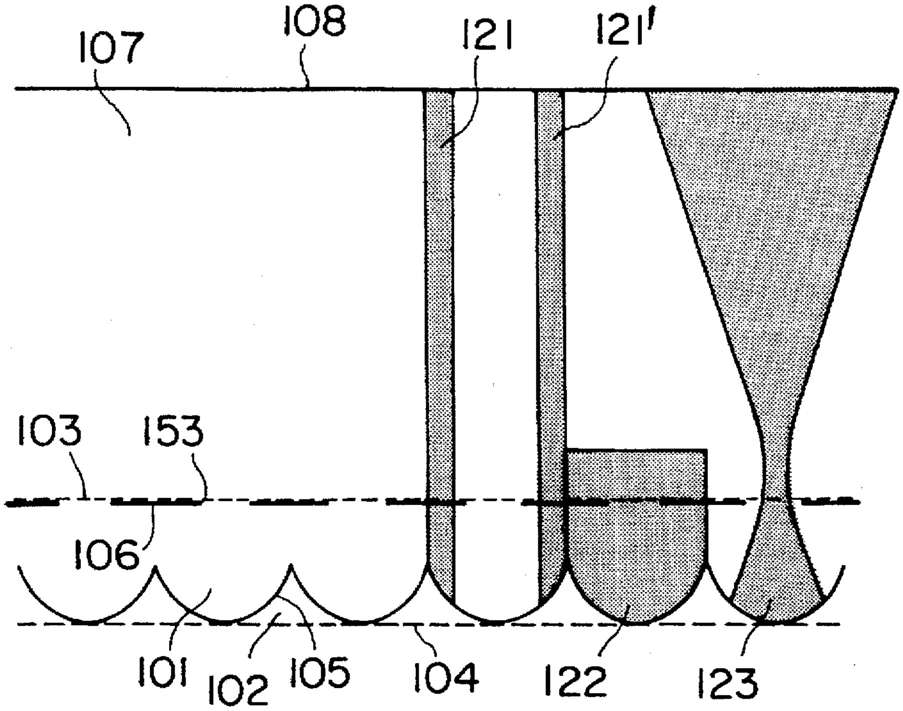
FIG. 24 is a schematic sectional view of a microlens array sheet used in the present invention showing a preferred embodiment.

FIG. 24 shows a microlens array sheet satisfying all the above-described conditions. In the microlens array sheet shown in FIG. 24, unit lenses having the same configurations of concavities/convexities planes and refractive indexes as those of unit lenses shown in FIGS. 25 to 27 are arranged on a transparent plastic base plate 107, and ray cut-off layers 106 cross portions corresponding to areas 121 and have end portions 153 in portions corresponding to areas 122. Further, rays having a refractive angle of not more than 28 degrees at the concavities/convexities plane of the unit lenses among rays, which do not pass the portions corresponding to areas 123 and are entered from the second substance layer side in parallel to a linear direction normal to the unit lens arrangement plane, do not pass the ray cut-off layers. In the microlens array sheet shown in FIG. 24, because air is used as the second substance layer, the second substance layer-side unit lens arrangement plane is a hypothetical plane 104 in the atmosphere.

An antistatic treatment, a hard coating treatment, an anti-reflection treatment due to an optical multi-layer thin film, and a non-glare treatment such as one performed on an observation surface of a conventional liquid crystal display device can be applied as needed on a surface of the microlens array sheet according to the present invention which becomes an observation surface when attached to a liquid crystal display device, for example, on the surface 4 of the first substance layer in the microlens array sheet shown in FIGS. 2 to 8, or on a surface opposite to the surface provided with the ray cut-off layer 6 of the transparent plastic substrate plate 7 in the structure shown in FIG. 3.

Further, in order to facilitate the attachment of the microlens array sheet to a liquid crystal cell, the second substance layer or the tip portions of the convex portions of the first substance layer penetrated through the second substance layer can be composed of a sticky or adhesive material, or a layer of a sticky or adhesive material can be added onto the surface of the second substance layer or the tip portions of the convex portions of the first substance layer.

The base material on which a microlens array sheet is formed can be selected depending on the use, and it is not particularly restricted. The most general method is to use a microlens array sheet formed on a glass or a transparent plastic film. In this case, a base material composed of a transparent plastic film is preferred from the viewpoint of ease of handling and formation of lens surfaces. Further, a microlens array sheet also can be incorporated into a polarizing film with which a liquid crystal display device is equipped. In particular, when a polarizing film having a structure wherein a protecting film is stacked on a polarizing element is employed, a polarizing film with a microlens array sheet can be realized by using a protecting film in which the microlens array sheet is preformed, and this method is preferred because a liquid crystal display device equipped with the microlens array sheet according to the present invention can be produced without adding any process to the conventional process for producing liquid crystal display devices.

The size and position of the unit lens in the microlens array sheet according to the present invention can be designed depending on the size of the display element of the liquid crystal cell, and it is preferred that two or more lenses correspond to a single display element. By this, the generation of a moire due to interference between the pitch of the lens arrangement of the microlens array sheet and the pitch of the display elements of the cell can be suppressed. More preferably four or more unit lenses correspond to a single display element, and further more preferably eight or more unit lenses correspond to a single display element.

The number "n" of the unit lenses corresponding to a single display element is defined by the following equation (A) in a case of a one-dimensional microlens array sheet, and by the following equation (B) in a case of a two-dimensional microlens array sheet, respectively.

$$n=N/(L/1) \quad (A)$$

$$n=N/(A/a) \quad (B)$$

where, N is the total number of unit lenses present on the effective display surface of the liquid crystal display device, L is the length of the liquid crystal cell in the direction of unit lens arrangement of the one-dimensional microlens array sheet, "1" is the length of the portion contributing to the display in a single display element of the liquid crystal cell in the lens arrangement direction, A is the area of the display surface of the liquid crystal display device, and "a" is the area of the portion contributing to the display in a single display element of the liquid crystal cell. These equations indicate the average number of the unit lenses corresponding to display element portions which are present in an area of the display surface of the liquid crystal display device removing portions which do not directly contribute to the display such as a space for wiring.

EXAMPLES

Hereinafter, the present invention will be explained in more detail with reference to specific examples. Examples 1 and 2, Comparative Examples 1 to 4:

Firstly, examples of the liquid crystal display device I according to the present invention will be explained.

(1) Preparation of microlens array sheet

A microlens array sheet arranged with unit lenses having a sectional shape shown in FIG. 3 was prepared. This is referred to as "MLA-1". The pitch of arrangement of the unit lenses of MLA-1 is 33 μm, the refractive index of the first substance layer 1 is 1.49 and the refractive index of the second substance layer 2 is 1.00 because it is air.

The diffusion of this MLA-1 is ±55 degrees in the unit lens arrangement direction and ±5 degrees in a direction perpendicular thereto, and the direction of the diffusion axis conforms to the unit lens arrangement direction.

Further, a microlens array sheet having a configuration shown in FIGS. 6 to 8 was prepared. This is referred to as "MLA-2". This MLA-2 is a two-dimensional microlens array sheet. The pitch of arrangement of the unit lenses in the vertical direction of the paper depicting FIG. 6 is 55 μm, the pitch of arrangement of the unit lenses in the left-hand/right-hand direction of the paper is 41 μm, and the refractive indexes of the respective layers are the same as those of MLA-1.

The diffusion of MLA-2 is the greatest in the left-hand/right-hand direction of the paper depicting FIG. 6 and it is ±45 degrees, and successively great diffusion is indicated in the vertical direction of the paper and it is ±30 degrees. The diffusion is the smallest in the diagonal direction of the unit lens and it is ±25 degrees. Therefore, the direction of the diffusion axis is the left-hand/right-hand direction of the paper.

(2) Preparation of liquid crystal cell

An oriented film was formed on each of two glass base plates each equipped with a transparent electrode and having a size of 10 cm×10 cm, and after rubbing, they are laminated via a spherical spacer, a liquid crystal is injected between the base plates, and a polarizing film is bonded onto the glass base plate. Thus, a twisted nematic liquid crystal cell was prepared.

(3) Formation of liquid crystal display device

Each microlens array sheet prepared in (1) was attached to the observation surface side of the liquid crystal cell prepared in (2) such that the first substance layer side was positioned at the observation surface side. In such a condition, the attachment direction was variously changed. The attachment directions in the respective liquid crystal display devices are shown in Table 1. The optical axes of the respective constitutional elements of the liquid crystal display devices in the Examples are the same as those shown in FIG. 9.

(4) Estimation

A light source with a projection lens was placed on the non-observation surface of the liquid crystal display device prepared in (3) The optical axis from the light source (a direction having the highest luminance) was conformed to the linear direction normal to the surface of the liquid crystal cell.

Several kinds of parallel louver-like optical collimators were placed between the light source and the liquid crystal cell to change the directive angle of the backlight source, and adjusted such that the image displayed by the liquid crystal display device could be observed from all the directional angles in a condition of the inclination angle of 45 degrees depending upon the respective liquid crystal display devices.

In this adjustment, in a case where the microlens array sheet was a one-dimensional microlens array sheet, one optical collimator was used and the direction of arrangement of the louvers was conformed to the unit lens arrangement direction.

In a case where the microlens array sheet was a two-dimensional microlens array sheet, two optical collimators were disposed so that the respective directions of arrangement of the respective louvers were conformed to the respective two unit lens arrangement directions.

A luminance meter was placed on the observation surface side of each liquid crystal display device, and a contrast ratio, which was defined as a value calculated by dividing a luminance Lmax indicated when a white (the brightest color) is displayed on the liquid crystal display device by a luminance Lmin indicated when a black (the darkest color) is displayed on the liquid crystal display device, was determined.

The result is shown as a minimum contrast ratio determined when the inclination angle β is fixed and the directional angle α is changed so as to make a round around an axis extending in a linear direction normal to the observation surface.

The results of Examples 1 and 2 and Comparative Examples 1 to 4 are shown in Table 1.

Figure 10:
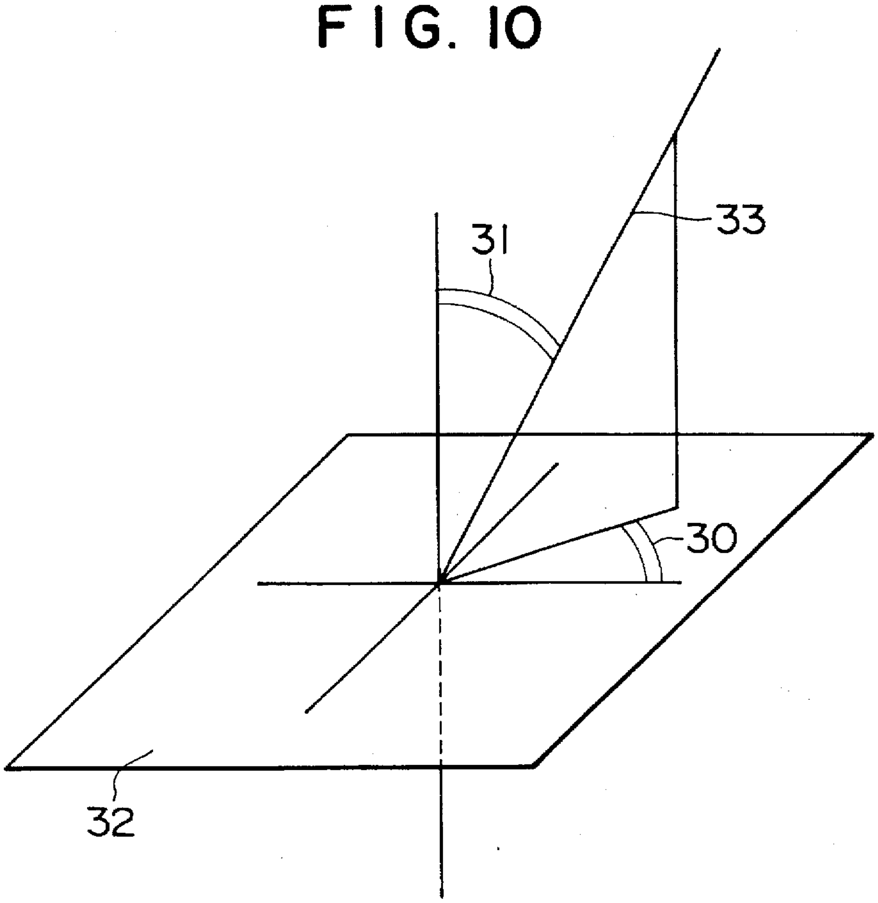
FIG. 10 is a view explaining the definition of an angle used in estimation.

The directional angle α indicating the measurement direction and the inclination angle β are angles relative to the observation surface of the liquid crystal display device, and the definition thereof is shown in FIG. 10. Namely, in FIG. 10, numeral 32 indicates an observation surface of a liquid crystal display device, numeral 33 indicates an observation direction (measurement direction of luminance), numeral 30 indicates a directional angle α, and numeral 31 indicates an inclination angle β.

(3) Preparation of liquid crystal cell

A liquid crystal cell used in a TFT driving-system color liquid crystal display device mounted on a notebook-type personal computer on the market was employed.

In this liquid crystal cell, one dot (a single display element) is formed from three original colors of R (red), G (green) and B (blue), and the pitch of arrangement of the display elements is 0.30 mm in each of the vertical and transverse directions. Further, although a relatively wide visible angle of about 45 degrees is indicated in each of the left-hand and right-hand directions in the transverse direction, with respect to the visible angle in the vertical direction, in a case of a display mode with 256 colors, the visible angle in the upper direction is about 10 degrees and the visible angle in the lower direction is about 25 degrees, and thus the display quality is poor.

TABLE 1

| | Number of MLA | Angle between direction of liquid crystal orientation and direction of diffusion axis of microlens array sheet (degree) | Minimum directive angle of backlight source (degree) | Result of estimation (contrast ratio) Directional angle α = 30 degrees | Result of estimation (contrast ratio) Directional angle α = 45 degrees |
|---|---|---|---|---|---|
| Example 1 | MLA-1 | 0 (conformed) | 10 | 84 | 72 |
| Example 2 | MLA-2 | 0 (conformed) | 10 | 63 | 58 |
| Comparative Example 1 | MLA-1 | 23 | 10 | 38 | 12 |
| Comparative Example 2 | MLA-1 | 45 | 10 | 22 | 9 |
| Comparative Example 3 | MLA-2 | 45 | 10 | 38 | 18 |
| Comparative Example 4 | — | not equipped with microlens array sheet | 40 | 5 | 2 |

From Table 1, it is understood that a good image can be observed from any direction in a deep angle such as an inclination angle of 45 degrees in the liquid crystal display device I according to the present invention.

Particularly, in a case where a one-dimensional microlens array sheet is used, a liquid crystal display device in which a problem on visible angle is substantially solved can be obtained by increasing only the directivity of the backlight source in the direction of the diffusion axis of the microlens array sheet, and decrease of the utilization efficiency of ray bundle or productivity due to making a device complicated substantially does not occur. Namely, merely by a simple operation wherein the microlens array sheet is attached to the observation surface of the liquid crystal cell in a condition directing the sheet in a specified direction, a liquid crystal display device substantially free from the problem on visible angle can be obtained.

Examples 3 to 6, Comparative Examples 5 to 7

Next, examples of the liquid crystal display device II according to the present invention will be explained.

(1) Preparation of microlens array sheet

Figure 23:
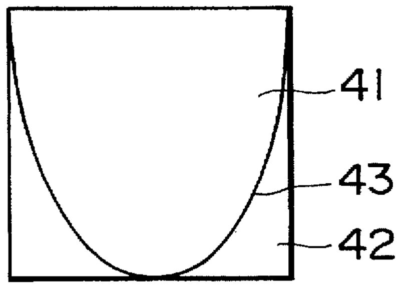
FIG. 23 is a schematic sectional view of a unit lens of a microlens array sheet used in an Example.

A one-dimensional microlens array sheet arranged with unit lenses having a sectional shape shown in FIG. 23 was prepared. The pitch of arrangement of the unit lenses of this MLA is 33 μm, the refractive index of the first substance layer 1 is 1.49 the refractive index of the second substance layer 2 is 1.00 because it is air.

(2) Preparation of backlight source

BL-1 to BL-6 having the properties shown in Table 2 were prepared as backlight sources. The structures and characteristics of the respective backlight sources also are shown in Table 2.

(4) Formation of liquid crystal display device

The MLA prepared in the above-described (1) was disposed on the observation surface side of the liquid crystal cell prepared in the above-described (3) such that the unit lenses of the MLA were brought into contact with the surface of the liquid crystal cell. Fixing the MLA to the liquid crystal cell was performed by bonding the MLA to the surface of the liquid crystal cell with an end portion of the liquid crystal display device which does not contribute to display.

As a result, the distance between the liquid crystal layer of the liquid crystal cell and the lens surface of the MLA was 1.28 mm. The direction of arrangement of the unit lenses was set at a direction vertical relative to the scope.

Further, the respective backlight sources BL-1 to BL-6 prepared in the above-described (2) were attached to the back surface of the liquid crystal cell, and the liquid crystal display devices LCD-1 to LCD-4 according to the present invention and the liquid crystal display devices LCD-5 and LCD-6 of Comparative Examples were made.

(5) Estimation

Various kind of letter images and photo images were displayed on the respective liquid crystal display devices prepared, and the image qualities when observed from front side and the image qualities when inclined in upper and lower directions with a pitch of angle of 5 degrees were determined. The visible angle was indicated as an allowable angle range in the upper and lower directions. The estimation was performed in dark room in order to avoid an affection due to outer rays.

The results of Examples 3 to 6 and Comparative Examples 5 to 7 are shown in Table 3.

The result in a liquid crystal display device which is merely mounted on a personal computer of (3), that is, a usual liquid crystal display device which is not equipped with an MLA and uses a backlight source having a small directivity, is also shown in Table 3 as LCD-7 (Comparative Example 7).

TABLE 2

| No. | Light source | Structure for providing directivity | Directive angle (degree) |
|---|---|---|---|
| BL-1 | cold cathode tube/edge light | louver sheet | 1.3 |
| BL-2 | cold cathode tube/edge light | louver sheet | 5 |
| BL-3 | cold cathode tube/edge light | louver sheet | 9 |
| BL-4 | visible-ray laser | laser beam expander | 0.5 |
| BL-5 | cold cathode tube/edge light | none | 45 |
| BL-6 | cold cathode tube/edge light | prism sheet | 30 |

TABLE 3

| | LCD No. | backlight source No. | p (mm) | d (mm) | χ (degree) | Visible angle (upward/downward) (degree) | Image quality from front side | | |
|---|---|---|---|---|---|---|---|---|---|
| | | | | | | | fuzziness | smoothness | clearness |
| Example 3 | LCD-1 | BL-1 | 0.3 | 1.28 | 1.3 | 60/60 | ⊙ | Δ | ⊙ |
| Example 4 | LCD-2 | BL-2 | 0.3 | 1.28 | 5 | 60/60 | ○ | ○ | ○ |
| Example 5 | LCD-3 | BL-3 | 0.3 | 1.28 | 9 | 60/60 | ○ | ○ | Δ |
| Example 6 | LCD-4 | BL-4 | 0.3 | 1.28 | 0.5 | 60/60 | ⊙ | Δ | ⊙ |
| Comparative Example 5 | LCD-5 | BL-5 | 0.3 | 1.28 | 45 | 60/60 | X | ○ | X |
| Comparative Example 6 | LCD-6 | BL-6 | 0.3 | 1.28 | 30 | 60/60 | X | ○ | X |
| Comparative Example 7 (MLA:none) | LCD-7 | BL-5 | 0.3 | — | 45 | 10/25 | ⊙ | Δ | ⊙ |

As is understood from Table 3, in the liquid crystal display device II according to the present invention, a wide visible angle and a high image quality can be both achieved simultaneously. By this, the problem on image quality in a liquid crystal display device can be solved, and by solving the restriction in use conditions due to a narrow visible angle, not only the conventional dissatisfaction can be solved but also development to new uses becomes possible.

Industrial Applications of the Invention

In the liquid crystal display device according to the present invention, a good image can be observed from any direction, and a liquid crystal display device, which has a simple structure but can solve the problem on visible angle, can be obtained. Moreover, a wide visible angle and a high image quality can be both achieved simultaneously, and the restriction in use conditions due to a narrow visible angle can be solved. Therefore, the liquid crystal display device according to the present invention can be broadly applied for any objects having a liquid crystal display device, for example, personal computers, word processors, television receivers, portable electronic instruments, game machines, information display devices mounted on cars and other various information display devices.

We claim:

1. A liquid crystal display device having at least a liquid crystal cell including display elements arranged lengthwise and crosswise and a microlens array sheet attached to an observation surface of said liquid crystal cell and including minute unit lenses arranged in a plane, characterized in that said microlens array sheet has at least one diffusion axis in said plane, and wherein the direction of said diffusion axis of said microlens array sheet is substantially within about 15 degrees of a direction of the liquid crystal orientation of said liquid crystal cell.

2. The liquid crystal display device according to claim 1, wherein said microlens array sheet is a one-dimensional microlens array sheet in which minute unit lenses each formed in a stripe-like shape are arranged in one direction.

3. The liquid crystal display device according to claim 2, wherein said liquid crystal cell uses a twisted nematic liquid crystal.

4. The liquid crystal display device according to claim 1 wherein said liquid crystal cell uses a twisted nematic liquid crystal.

5. The liquid crystal display device according to claim 1, wherein said microlens array sheet is formed by providing a first substance layer and a second substance layer having a refractive index less than a refractive index of said first substance layer between two planes extending parallel to each other and arranging minute unit lenses in plane which function as lenses by providing concavities and/or convexities to an interface defined between said first and second substance layers, and said microlens array sheet is attached so that the second substance layer side of said microlens array sheet is directed to the liquid crystal cell side and the first substance layer side thereof is directed to the observation side.

6. The liquid crystal display device according to claim 1, wherein the pitch of arrangement of said display elements of said liquid crystal cell is not more than 0.4 mm.

7. A liquid crystal display device constructed as a transmission type liquid crystal display device having a liquid crystal cell including display elements arranged lengthwise and crosswise, a microlens array sheet attached to an observation surface of said liquid crystal cell and including minute unit lenses arranged in plane and a backlight source characterized in that a relationship between a directivity of light emission of said backlight source and a pitch of arrangement of said display elements of said liquid crystal cell in a minute unit lens arrangement direction satisfies the following equation $$p \geqq d \tan \chi$$

Where, "p" (mm) indicates a length of a display element of said liquid crystal cell in said minute lens arrangement direction, that is, a pitch of arrangement of said display elements "d" (mm) indicates a distance from a liquid crystal layer to said minute unit lenses, $\chi$ indicates an angle defined between a direction indicating a maximum luminance, of said backlight source and a direction in which half of thee maximum luminance is indicated when the determination direction is inclined from the maximum luminance direction toward said minute unit lens arrangement direction in a point on said backlight source.

8. The liquid crystal display device according to claim 7, wherein said microlens array sheet has at least one diffusion axis in the plane and the direction of said diffusion axis of said microlens array sheet is conformed to a direction of the liquid crystal orientation of said liquid crystal cell.

9. The liquid crystal display device according to claim 7, wherein said microlens array sheet is a one dimensional microlens array sheet in which minute unit lenses, each formed in a stripe-shaped configuration, are arranged in a single direction.

10. The liquid crystal display device according to claim 7, wherein said microlens array sheet is a one-dimensional microlens array sheet in which minute unit lenses each formed in a stripe-like shape are arranged in one direction.

11. The liquid crystal display device according to claim 7, wherein said liquid crystal cell uses a twisted nematic liquid crystal.

12. The liquid crystal display device according to claim 7, wherein said microlens array sheet is formed by providing a first substance layer and a second substance layer having a refractive index less than a refractive index of said first substance layer between two planes extending parallel to each other and arranging minute unit lenses in plane which function as lenses by providing concavities and/or convexities to an interface defined between said first and second substance layers, and said microlens array sheet is attached so that the second substance layer side of said microlens array sheet is directed to the liquid crystal cell side and the first substance layer side thereof is directed to the observation side.

13. The liquid crystal display device according to claim 7, wherein the pitch of arrangement of said display elements of said liquid crystal cell is not more than 0.4 mm.

14. The liquid crystal display device according to claim 7, wherein "$\chi$" in said equation (1) is not less than 2.5 degrees.

* * * * *

UNITED STATES PATENT AND TRADEMARK OFFICE
CERTIFICATE OF CORRECTION

PATENT NO. : 5,745,199
DATED : April 28, 1998
INVENTOR(S) : Suzuki, et al

It is certified that error appears in the above-identified patent and that said Letters Patent is hereby corrected as shown below:

In Column 1, line 7, please change "visiblity" to --visibility--; and
line 28, before "change" please insert --resulting--.

In Column 3, line 31, please change "a", first occurrence, to --the--.

In Column 6, line 21, please change "to" to --at--.

In Column 8, line 48, please change "a", first occurrence, to --the--.

In Column 14, line 60, please change "convexitie s" to --convexities--.

In Column 19, line 44, please change "an" to --the--.

In Column 25, line 19, please change "thee" to --the--.

Signed and Sealed this

Thirteenth Day of July, 1999

Attest:

Q. TODD DICKINSON

Attesting Officer

*Acting Commissioner of Patents and Trademarks*

UNITED STATES PATENT AND TRADEMARK OFFICE

CERTIFICATE OF CORRECTION

PATENT NO. : 5,745,199
DATED : April 28, 1998
INVENTOR(S) : Suzuki et al.

It is certified that error appears in the above-identified patent and that said Letters Patent is hereby corrected as shown below:

Column 1,
Line 7, please change "visiblity" to -- visibility --; and
Line 28, before "change" please insert -- resulting --.

Column 3,
Line 31, please change "a", first occurrence, to -- the --.

Column 6,
Line 21, please change "to" to -- at --.

Column 8,
Line 48, please change "a", first occurrence, to -- the --;

Column 14,
Line 60, please change "convexitie s" to -- covexities --.

Column 19,
Line 44, please change "an" to -- the --.

Column 25,
Line 19, please change "thee" to -- the --.

Signed and Sealed this

Thirtieth Day of July, 2002

*Attest:*

JAMES E. ROGAN

*Attesting Officer*

*Director of the United States Patent and Trademark Office*